(12) United States Patent
Kang (10) Patent No.: US 10,341,990 B2
(45) Date of Patent: Jul. 2, 2019

(54) ELECTRONIC APPARATUS AND CONTROLLING METHOD THEREOF

(71) Applicant: SAMSUNG ELECTRONICS CO., LTD., Suwon-si (KR)

(72) Inventor: Woo-chul Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 76 days.

(21) Appl. No.: 15/467,038

(22) Filed: Mar. 23, 2017

(65) Prior Publication Data

US 2017/0303254 A1 Oct. 19, 2017

(30) Foreign Application Priority Data

Apr. 15, 2016 (KR) .................. 10-2016-0046443

(51) Int. Cl.
*H04W 72/04* (2009.01)
*H04W 52/06* (2009.01)
(Continued)

(52) U.S. Cl.
CPC ......... *H04W 72/0406* (2013.01); *H04W 4/80* (2018.02); *H04W 52/06* (2013.01);
(Continued)

(58) Field of Classification Search
None
See application file for complete search history.

(56) References Cited

U.S. PATENT DOCUMENTS

| 8,654,030 | B1 | 2/2014 | Mercer | |
|---|---|---|---|---|
| 2009/0323652 | A1* | 12/2009 | Chen | H04B 1/406 370/338 |

(Continued)

FOREIGN PATENT DOCUMENTS

| JP | 2015-503308 A | 1/2015 |
|---|---|---|
| KR | 10-1271270 B1 | 6/2013 |

(Continued)

OTHER PUBLICATIONS

Anonymous, "3rd Generation Partnership Project; Technical Specification Group Radio Access Network; Evolved Universal Terrestrial Radio Access (E-UTRA); Study on signalling and procedure for interference avoidance for in-device coexistence (Release 11)", 3rd Generation Partnership Project (3GPP), Dec. 22, 2011, vol. RAN WG2, Issue No. V11.2.0, XP050555147, 44 pages total.

(Continued)

*Primary Examiner* — Saumit Shah
(74) *Attorney, Agent, or Firm* — Sughrue Mion, PLLC (57) ABSTRACT

An electronic apparatus and a controlling method thereof are provided. The electronic apparatus includes: a first communication module configured to communicate in a first communication method, and a second communication module configured to communicate in a second communication method. The first communication module is further configured to change a transmission output level of the first communication module from a first transmission output level to a second transmission output level in response to the second communication module receiving data, and change the transmission output level from the second transmission output level to the first transmission output level in response to the second communication module completing the reception of the data.

17 Claims, 9 Drawing Sheets

(51) Int. Cl.
*H04W 52/24* (2009.01)
*H04W 52/36* (2009.01)
*H04W 52/38* (2009.01)
*H04W 4/80* (2018.01)
*H04B 7/06* (2006.01)
*H04W 88/06* (2009.01)

(52) U.S. Cl.
CPC ....... *H04W 52/242* (2013.01); *H04W 52/243* (2013.01); *H04W 52/362* (2013.01); *H04W 52/38* (2013.01); *H04B 7/06* (2013.01); *H04W 52/245* (2013.01); *H04W 88/06* (2013.01)

(56) References Cited

U.S. PATENT DOCUMENTS

| | | |
|---|---|---|
| 2011/0149920 A1 | 6/2011 | Liu et al. |
| 2012/0120892 A1 | 5/2012 | Freda et al. |
| 2012/0327869 A1 | 12/2012 | Wang et al. |
| 2013/0295990 A1 | 11/2013 | Jechoux |
| 2013/0336419 A1 | 12/2013 | Weinrib et al. |
| 2014/0071933 A1 | 3/2014 | Lee et al. |
| 2014/0087663 A1 | 3/2014 | Burchill et al. |
| 2014/0185494 A1 | 7/2014 | Yang et al. |
| 2014/0369187 A1 | 12/2014 | Sang et al. |
| 2015/0119098 A1 | 4/2015 | Hsu et al. |
| 2015/0188733 A1 | 7/2015 | Oh et al. |
| 2015/0381291 A1 | 12/2015 | Mahajan et al. |

FOREIGN PATENT DOCUMENTS

| | | |
|---|---|---|
| KR | 10-2014-0024882 A | 3/2014 |
| KR | 10-2015-0079564 A | 7/2015 |
| KR | 10-2015-0080049 A | 7/2015 |

OTHER PUBLICATIONS

Communication dated Jun. 21, 2017, issued by the European Patent Office in counterpart European Patent Application No. 17162850.6.
Search Report dated Jun. 26, 2017, issued by the International Searching Authority in counterpart International Patent Application No. PCT/KR2017/003212 (PCT/ISA/210).
Written Opinion dated Jun. 26, 2017, issued by the International Searching Authority in counterpart International Patent Application No. PCT/KR2017/003212 (PCT/ISA/237).
Communication dated Feb. 21, 2018, issued by the European Patent Office in counterpart European application No. 17 162 850.6.

* cited by examiner

ELECTRONIC APPARATUS AND CONTROLLING METHOD THEREOF

CROSS-REFERENCE TO RELATED APPLICATIONS

This application claims priority from Korean Patent Application No. 10-2016-0046443, filed in the Korean Intellectual Property Office on Apr. 15, 2016, the disclosure of which is incorporated herein by reference in its entirety.

BACKGROUND

1. Field

Exemplary embodiments relate to an electronic apparatus capable of avoiding wireless signal coexistence interference of a plurality of communication modules, and a controlling method thereof.

2. Description of the Related Art

While electronic devices such as set-top boxes (STBs) are becoming smaller in size, the number of wireless communication modules installed on one electronic device is increasing. For example, a single STB may include a WiFi module, a ZigBee module, a Radio Frequency for Consumer Electronics (RF4CE) module, a Bluetooth (BT) module, a Bluetooth Low Energy (BLE) module, and the like. In that case, interference may occur between signals of the respective wireless communication modules and therefore may adversely affect the communication quality of the STBs.

In the related art, attempts have been made to solve the problem by a method of ensuring a sufficient distance between the wireless communication modules. If a sufficient distance can be secured, even if a plurality of wireless communication modules using the same frequency band operate simultaneously, it is possible to avoid the influence of coexistence interference.

However, since many small electronic devices have adopted Multiple Input Multiple Output (MIMO) antenna technology to provide wireless communication at a high speed and stability, it is difficult to solve the coexistence interference problem in the method of changing the shape and the arrangement position of the antenna as in the related art.

For example, when an electronic device (e.g., set-top box) includes a WIFI module which is operated based on the MIMO antenna technology, along with a ZigBee module, a RF4CE module, and a Bluetooth module, communication signal interference may affect the entire electronic device because the output of the WIFI module is greater than the output of the ZigBee, RF4CE, and Bluetooth modules. The set-top box may use the ZigBee, RF4CE, and Bluetooth modules to communicate with a remote controller. When the transmission power level (Tx power level) of the WIFI module exceeds a recognizable maximum reception power level (Rx power level) of the ZigBee, RF4CE, and Bluetooth modules, the ZigBee, RF4CE, and Bluetooth modules may be in saturation state. In such a case, the set-top box may not be able to recognize signals from the remote controller and the user cannot control the set-top box using the remote controller.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide an electronic apparatus which, when a wireless communication module of the MIMO specification and another wireless communication module using the same frequency coexist within one electronic apparatus, adjusts such that the interference by the wireless communication output level of the MIMO specification does not exceed the absolute maximum reception level of the other wireless communication module, and a controlling thereof.

According to an aspect of an exemplary embodiment, there is provided an electronic apparatus including: a first communication module configured to communicate in a first communication method; and a second communication module configured to communicate in a second communication method, wherein the first communication module is further configured to change a transmission output level of the first communication module from a first transmission output level to a second transmission output level in response to the second communication module receiving data, and change the transmission output level from the second transmission output level to the first transmission output level in response to the second communication module completing the reception of the data.

According to an aspect of another exemplary embodiment, there is provided a controlling method of an electronic apparatus including: performing wireless communication using a first communication module; in response to data being received by a second communication module during the wireless communication, changing a transmission output level of the first communication module from a first transmission output level to a second transmission output level; and in response to the second communication module completing the reception of the data, changing the transmission output level of the first communication module from the second transmission output level to the first transmission output level.

According to an aspect of another exemplary embodiment, there is provided an electronic apparatus including: a first communication module that comprises a plurality of first antennas and is configured to wirelessly communicate in a first communication method using the plurality of first antennas; a second communication module that comprises at least one second antenna and is configured to wirelessly communicate in a second communication method that is different from the first communication method and consume low power compared to the first communication module; and a processor configured to adjust, in response to the second communication module being in a state of receiving data, a transmission power level of the first communication module based on distance between each of the plurality of first antennas and the at least one second antenna.

The transmission power level of the first communication module includes a transmission power level of each of the plurality of first antennas; and the processor may be further configured to determine path loss of signals that are transmitted from the plurality of first antennas to the at least one second antenna, and adjust the transmission power level of each of the plurality of first antennas based on the path loss and an absolute maximum reception level of the second communication module.

According to various exemplary embodiments, it is possible to avoid wireless signal coexistence interference of an electronic apparatus including a plurality of wireless communication modules.

BRIEF DESCRIPTION OF THE DRAWINGS

The above and/or other aspects will be more apparent by describing certain exemplary embodiments, with reference to the accompanying drawings, in which.

DETAILED DESCRIPTION

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

The terms "first," "second," etc. may be used to describe diverse components, but the components are not limited by the terms. The terms are only used to distinguish one component from the others. For example, used orders, arrangement orders, or the like of elements that are combined with these ordinal numbers may not be limited by the numbers. If necessary, the ordinal numbers may be respectively replaced and used.

The terms used in the following description are provided to explain example embodiments and are not intended to limit the scope. It is to be understood that the singular forms "a," "an," and "the" include plural referents unless the context clearly dictates otherwise. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

Figure 1:
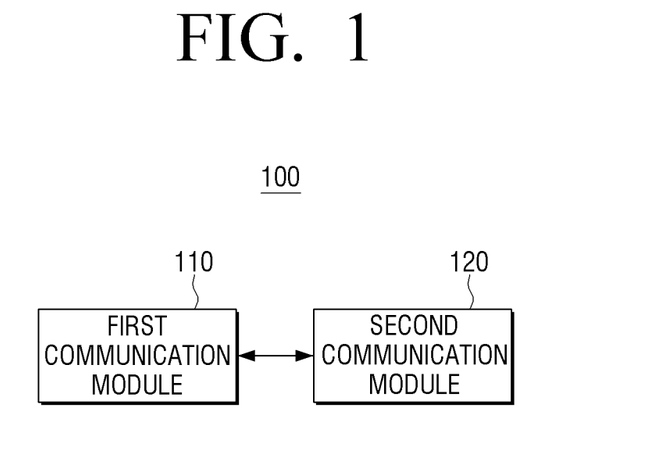
FIG. 1 is a block diagram for schematically illustrating a configuration of an electronic apparatus according to an exemplary embodiment.

FIG. 1 is a block diagram to illustrate a configuration of an electronic apparatus 100 according to an exemplary embodiment. Referring to FIG. 1, the electronic apparatus 100 may include a first communication module 110 and a second communication module 120.

The first communication module 110 may communicate with an external device through a first communication method. The first communication method may be referred to as Wireless Local Area Network (WLAN) communication. For example, the first communication method may be one of WIFI and WIFI direct. In addition, the first communication module may include a plurality of antennas and may be implemented in a MIMO specification.

The second communication module 120 may communicate with an external device through a second communication method. For example, the second communication method may be one of Bluetooth, Bluetooth Low Energy (BLE), ZigBee, and Radio Frequency for Consumer Electronics (RF4CE).

The first communication module 110 and the second communication module 120 may use the entire Industrial-Science-Medical (ISM) band in the 2.4 GHz frequency band.

According to an exemplary embodiment, an output level of the first communication module 110 may be greater than an output level of the second communication module 120. The output level may be referred to as an output power level. In various exemplary embodiments, the reception state of the second communication module 120 may not be affected by the influence of a transmission output level of the first communication module 110.

According to an exemplary embodiment, when the second communication module 120 receives data, the first communication module 110 may change the transmission power level. Specifically, when the second communication module 120 is in a data reception (Rx) state, the first communication module 110 may reduce the transmission output level so as not to interfere with the second communication module 120.

When the data reception of the second communication module 120 is completed, the first communication module 110 may restore the reduced transmission output level to the transmission output level before the change.

As another example, when the second communication module 120 is changed from a first state in which data is received to a second state in which data is transmitted, the first communication module 110 may restore the reduced transmission output level to the transmission output level before the change.

According to another exemplary embodiment, when the second communication module 120 performs communication with an external device, the first communication module 110 may change the transmission output level. Specifically, when a communication execution request using the second communication module 120 is received in the electronic apparatus 100, the first communication module 110 decreases the transmission output level so that coexistence interference is not generated in the second communication module 120.

When the communication using the second communication module 120 is completed, the first communication module 110 may restore the reduced transmission output level to the transmission output level before the change.

In the case in which a plurality of communication modules coexist within one electronic apparatus 100, the electronic apparatus 100 may control the transmission power level (Tx power level) of one of the communication modules to be lower than or equal to the absolute maximum reception level (absolute maximum Rx level) of the other communication module to prevent malfunction of the communication modules due to interference.

Figure 2:
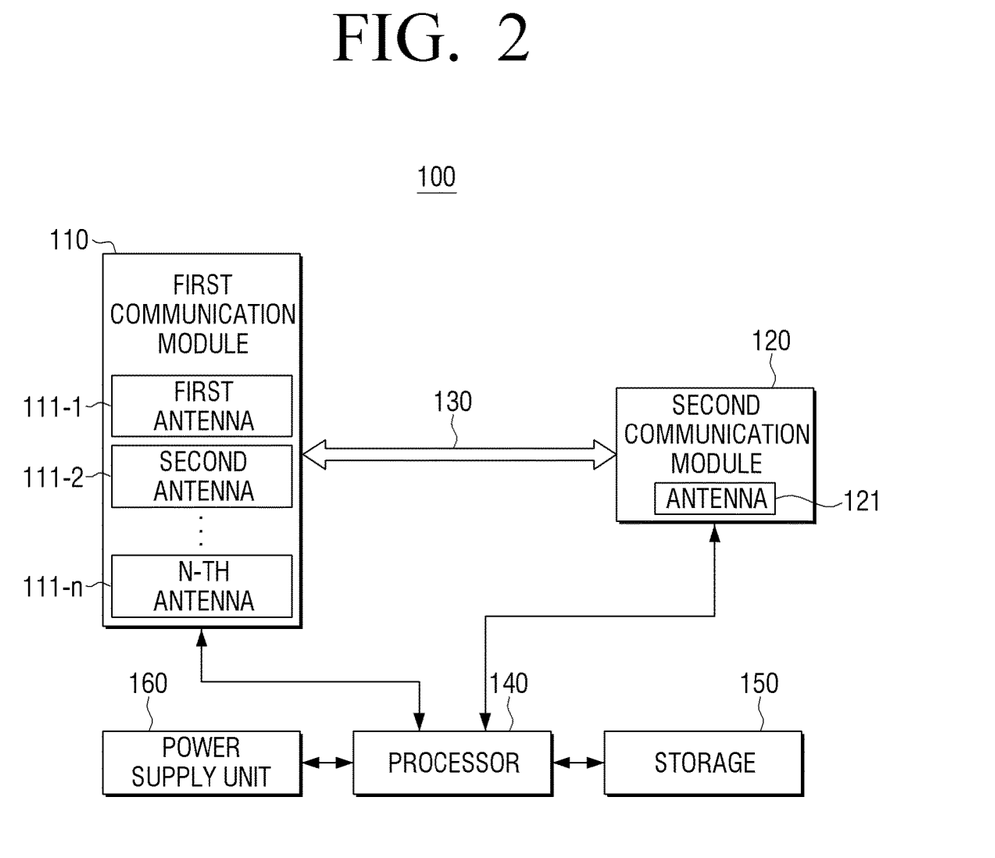
FIG. 2 is a block diagram for explaining a detailed configuration of an electronic apparatus according to an exemplary embodiment.

FIG. 2 is a block diagram for explaining a detailed configuration of an electronic apparatus 100 according to an exemplary embodiment. Referring to FIG. 2, the electronic apparatus 100 may include a first communication module 110, a second communication module 120, an interface 130, a processor 140, a storage 150, and a power supply unit 160. However, the configuration of the electronic apparatus 100 is not limited to the configuration shown in FIG. 2, and may include additional configurations depending on the implementation. For example, when implemented as a set-top box, the electronic apparatus 100 may further include a decoder, a tuner, and the like.

As in the embodiment shown in FIG. 2, the first communication module 110 may be implemented based on a MIMO specification and may include a plurality of antennas 111-1, 111-2, . . . , 111-n. For example, the first communication module 110 may be a WIFI communication module of MIMO specifications such as 2×2 MIMO, 3×3 MIMO, 4×4 MIMO, and the like. The 2×2 MIMO indicates two transmitting antennas and two receiving antennas, the 3×3 MIMO indicates three transmitting antennas and three receiving antennas, and the 4×4 MIMO indicates four transmitting antennas and four receiving antennas. The first communication module 110 may change the transmission output level of each of the plurality of antennas 111-1, 111-2, . . . , 111-n. The distance from the second communication module 120 is determined according to the arrangement position of each of the plurality of antennas 111-1, 111-2, . . . , 111-n, and as a result, a reduction amount of the output level that is determined by the electronic apparatus 100 may vary.

In the exemplary embodiment of FIG. 2, it is assumed that the second communication module 120 includes a single antenna 121. However, the exemplary embodiment is not limited thereto, and the second communication module may include more than one antennas.

The electronic apparatus 100 may include an interface 130 that connects the first communication module 110 to the second communication module 120. For example, the interface 130 may be implemented as a wired interface such as a Universal Asynchronous Receiver/Transmitter (UART), Inter Integrated Circuit (I2C), and General Purpose Input/Output (GPIO), to allow the first communication module 110 and the second communication module 120 to communicate with each other.

The second communication module 120 may transmit a first signal indicating a data reception (RX) state of the second communication module 120 to the first communication module 110 through the interface 130 when the second communication module 120 is in the Rx state in which data is received. In addition, the second communication module 120 may transmit a second signal indicating completion of data reception to the first communication module 110 through the interface 130 when the Rx state is complete.

In another exemplary embodiment, when the second communication module 120 is changed from the Rx state to a data transmission (Tx) state in which data is transmitted, the second communication module 120 may transmit the second signal indicating the Tx state to the first communication module 110 via the interface 130.

For example, if the interface 130 is a GPIO, the second communication module 120 may transmit the Rx/Tx state using a low/high signal using one port. In this case, the first signal may be a low signal and the second signal may be a high signal.

When the first signal is received from the second communication module 120, the first communication module 110 may determine a distance between the plurality of antennas 111-1, 111-2, 111-3, 111-4 of the first communication module 110 and the antenna 121 of the second communication module 120 and may determine the absolute maximum reception level of the second communication module 120. Accordingly, the transmission output level may be changed. When the second signal is received from the second communication module 120, the first communication module 110 may recover the transmission output level to the output level before the change. As described above, the second signal may be a signal indicating completion of data reception or a signal indicating data transmission state. A method of changing to the optimal transmission output level will be described in detail below with reference to FIGS. 3, 4A, and 4B.

The processor 140 may control the overall configuration of the electronic device 100. For example, the processor 140 may measure the path loss of the first communication module 110. Path loss refers to the power level that is lost as a radio wave progresses, and may be expressed as a function of frequency and distance.

According to an exemplary embodiment, it is possible to calculate the power level at the time when the radio wave output from each antenna 111 of the first communication module 110 reaches the antenna 121 of the second communication module 120. In addition, the first communication module 110 may determine the degree of reduction of the transmission output level based on the calculated path loss.

According to another exemplary embodiment, the processor 140 may perform a test measurement of the path loss of the first communication module 110 so that the power level when the radio wave output from each antenna 111-1, 111-2, 111-3, 111-4 of the first communication module 110 reaches the antenna 121 of the second communication module 121. In addition, the processor 140 may store the measurement result in the storage 150. For example, the processor 140 may store the measurement result in a table format. The first communication module 110 may determine the degree of reduction of the transmission output level using the path loss measurement result stored in the storage 150.

According to another exemplary embodiment, when the absolute maximum reception level of the second communication module 120 is changed, the processor 140 may control the first communication module 110 to readjust the transmission output level reduction degree of the first communication module 110. For example, the position of the communication counterpart of the second communication module 120 may be changed and the absolute maximum reception level of the second communication module 120 may be changed. In this case, the processor 140 may readjust the transmission output level of the first communication module 110 in real time.

The power supply unit 160 may supply power to the configurations of the electronic apparatus 100. Since the first communication module 110 and the second communication module 120 are included in one electronic apparatus 100, the first communication module 110 and the second communication module 120 are connected to the power supply unit 160 to receive power.

Figure 3:
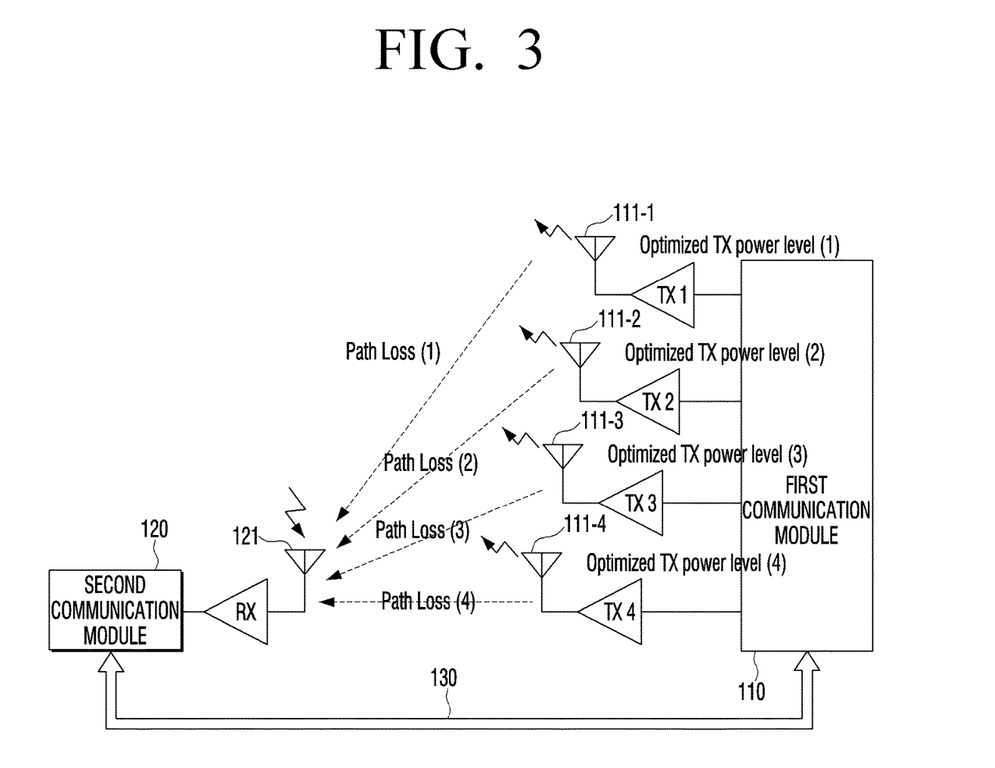
FIG. 3 is a diagram for illustrating coexistence interference avoidance between a plurality of communication modules of an electronic apparatus according to an exemplary embodiment.

FIG. 3 is a diagram for illustrating coexistence interference avoidance between a plurality of communication modules of an electronic apparatus 100 according to an exemplary embodiment. In the embodiment of FIG. 3, the first communication module 110 may be a WIFI communication module of the MIMO specification including four antennas 111-1, 111-2, 111-3, and 111-4. The second communication module 120 may be a Bluetooth or RF4CE communication module. In addition, the electronic apparatus 100 may transmit/receive signals between the first communication module 110 and the second communication module 120 through the interface 130.

Since the first communication module 110 and the second communication module 120 are disposed in the electronic apparatus 100 according to an exemplary embodiment, a radio wave output from each of the antennas 111-1, 111-2, 111-3, and 111-4 may affect the antenna 121 of the second communication module 120. The level of the radio wave reaching the antenna 121 of the second communication module 120 is lower than the level of the radio wave that is outputted from the antenna 110 because the radio wave outputted from the first communication module 110 passes through the space and is path-lost.

When the second communication module 120 is in the Rx state, the first communication module 110 may adjust the output level of each of the antennas 111-1, 111-2, 111-3, and 111-4 to prevent the second communication module 120 from being saturated. For example, the first communication module 110 may adjust the output level of the radio wave base on path loss of the radio wave between the antennas 111-1, 111-2, 111-3, and 111-4 of the first communication module 110 and the antenna 121 of the second communication module 120, so that when the antenna 121 of the second communication module 120 receives the radio wave, the reception level of the radio wave does not exceed the absolute maximum reception level of the second communication module 120.

In the exemplary embodiment of FIG. 3, the first communication module 110 may set an optimal output level for each of the antennas 111-1, 111-2, 111-3, and 111-4 based on path losses (1)-(4) of each of the antennas 111-1, 111-2, 111-3, and 111-4. For example, the optimal output level may be a maximum value that satisfies a condition that does not affect the operation of the second communication module 120.

For example, using a free-space path loss (FSPL) formula, the loss (PL) in signal strength of the radio wave when the radio wave outputted from each of the antennas 111-1, 111-2, 111-3, and 111-4 of the first communication module 110 reaches the antenna 121 of the second communication module 120 may be calculated. Equation 1 below is the FSPL formula.

$$PL(\text{isolation}) = 20\log_{10}\left(\frac{4\pi d}{\lambda}\right) \quad [\text{Equation 1}]$$
$$= 20\log_{10}(f) + 20\log_{10}(d) + 20\log_{10}\left(\frac{4\pi}{c}\right)$$

In Equation 1, d denotes a distance between the plurality of antennas 111-1, 111-2, 111-3, and 111-4 of the first communication module 110 and the antenna 121 of the second communication module 120. The distance d may be measured from each of the plurality of antennas 111-1, 111-2, 111-3, and 111-4 of the first communication module 110 to the antenna 121 of the second communication module 120, or from a reference point (e.g., central point) of the plurality of antennas 111-1, 111-2, 111-3, and 111-4 of the first communication module 110 to the antenna 121 of the second communication module 120. In addition, f denotes a frequency used by the first communication module 110 and the second communication module 120. $\lambda$ is a wavelength of a radio wave corresponding to the frequency, and c is the speed of light.

In Equation 1, if the unit of frequency is GHz ($10^9$ Hz) and the unit of distance is m, the equation can be simplified as shown in Equation 2 below.

$$PL(\text{isolation}) = 20\log_{10}(f) + 20\log_{10}(d) + 32.44 \quad [\text{Equation 2}]$$

Table 1 shows the path loss according to the distance at 2.4 GHz obtained using Equation 2.

TABLE 1

| PL (unit: dB) | distance (d) (unit: m) |
|---|---|
| 30 | 0.3 |
| 28 | 0.25 |
| 26 | 0.2 |
| 24 | 0.15 |
| 20 | 0.1 |

Figure 4A:
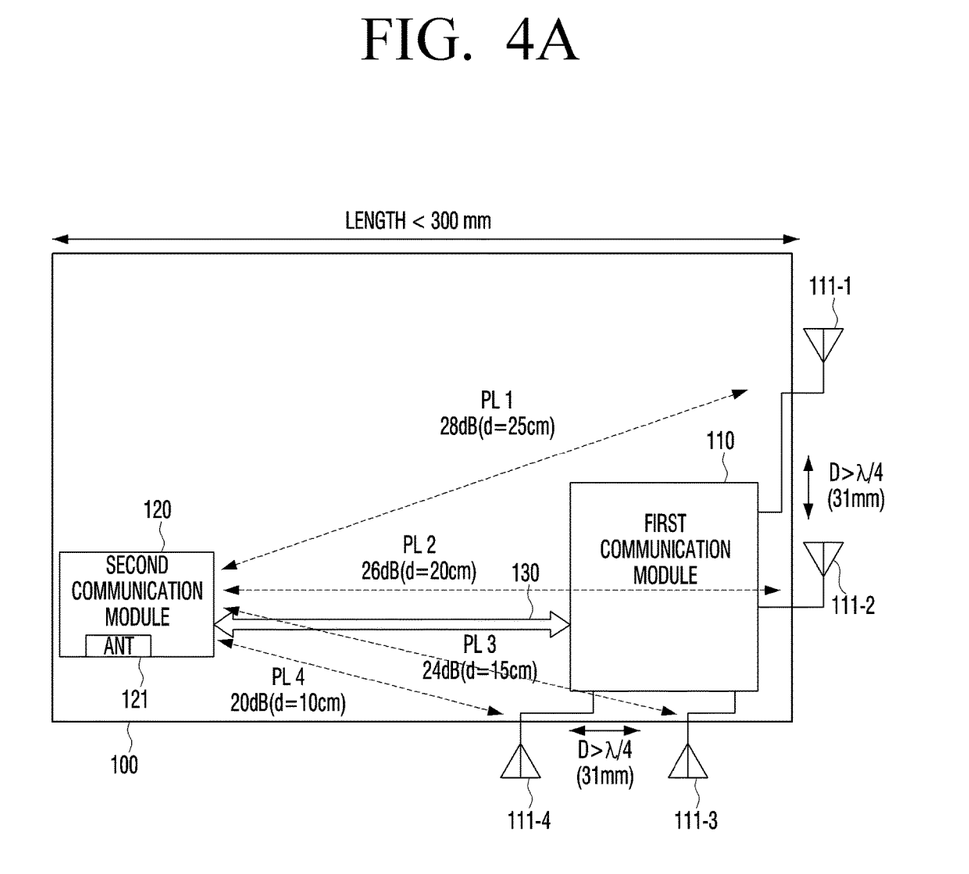
FIGS. 4A and 4B are diagrams for explaining coexistence interference avoidance between a plurality of communication modules when an electronic apparatus is implemented as a set-top box, according to an exemplary embodiment.
Figure 4B:
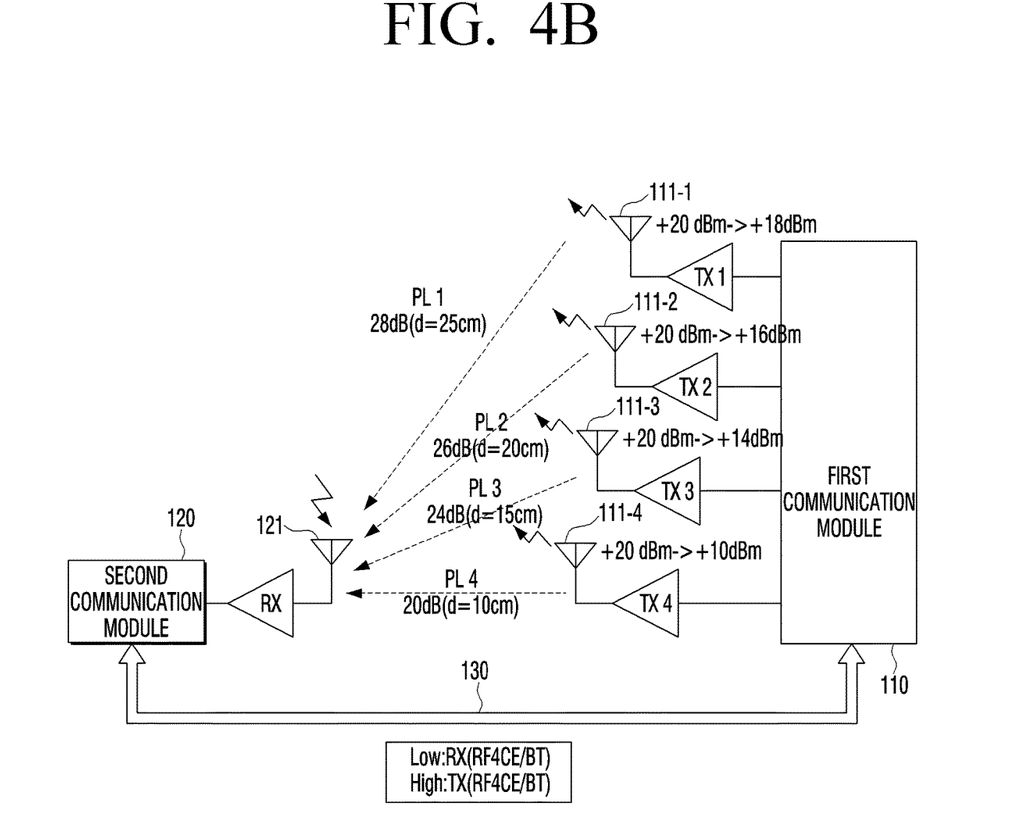

FIGS. 4A and 4B are diagrams for explaining coexistence interference avoidance between a plurality of communication modules when an electronic apparatus 100 is implemented as a set-top box, according to an exemplary embodiment. Referring to FIG. 4A, the electronic apparatus 100 may be implemented as a set-top box with a major axis length of 300 mm or less.

In FIG. 4A, the first communication module 110 may be a communication module of the MIMO specification including four antennas 111-1, 111-2, 111-3, and 111-4. Interference may also occur between the plurality of antennas 111-1, 111-2, 111-3, and 111-4 of the first communication module 110. Therefore, it is preferable that the plurality of antennas 111-1, 111-2, 111-3, and 111-4 are arranged so that the interval therebetween is longer than ¼ wavelength.

Accordingly, the distances between the antennas 111-1, 111-2, 111-3, and 111-4 of the first communication module 110 and the second communication module 120 are different for each antenna. In FIG. 4A, an example in which the interval between the second communication module and each of the antennas 111-1, 111-2, 111-3, and 111-4 of the first communication module is 25 cm, 20 cm, 15 cm, and 10 cm is shown. Referring to Table 1, it can be known that the path loss of each of the antennas 111-1, 111-2, 111-3, and 111-4 is 28, dB, 26 dB, 24 dB, and 20 dB, respectively.

FIG. 4B is a diagram for explaining the output level change degree of each of the antennas 111-1, 111-2, 111-3, and 111-4 of the first communication module 110 shown in FIG. 4A. When the first signal indicating reception state is received from the second communication module 120 through the interface 130, the first communication module 110 may change the output level of each of the antennas 111-1, 111-2, 111-3, and 111-4 according to a distance between each of the antennas 111-1, 111-2, 111-3, and 111-4 and the antenna 121 of the second communication module 120, a frequency used by the first communication module 110, and an absolute maximum reception level of the second communication module 120.

Referring to FIG. 4B, when the second communication module 120 is in a reception state, the second communication module 120 may transmit a first signal to the first communication module 110 through the interface 130. For example, the first signal may be a low signal. The first communication module 110 receiving the first signal may change the output level of each of the antennas 111-1, 111-2, 111-3, and 111-4.

For example, in order to avoid coexistence interferences when using the 2.4 GHz frequency, the antenna isolation may be greater than 30 dB. However, the antenna isolation degree of 30 dB is only one example value, and it goes without saying that different values may be required according to the specification, arrangement structure, etc. of the communication modules.

In FIG. 4B, since the distance between the first antenna 111-1 and the antenna 121 of the second communication module 120 is 25 cm and the first communication module 110 uses the 2.4 GHz frequency, the path loss of the first antenna 111-1 is 28 dB. Accordingly, the first communication module 110 may change the output level of the first antenna 111-1 from 20 dBm to 18 dBm, so that the antenna isolation degree is 30 dB.

Since the distance between the second antenna 111-2 and the antenna 121 of the second communication module 120 is 20 cm and the first communication module 110 uses the 2.4 GHz frequency, the path loss of the second antenna 111-2 is 26 dB. Accordingly, the first communication module 110 may change the output level of the second antenna 111-2 from 20 dBm to 16 dBm, so that the antenna isolation degree is 30 dB.

Since the distance between the third antenna 111-3 and the antenna 121 of the second communication module 120 is 15 cm and the first communication module 110 uses the 2.4 GHz frequency, the path loss of the third antenna 111-3 is 24 dB. Accordingly, the first communication module 110 may change the output level of the third antenna 111-3 from 20 dBm to 14 dBm, so that the antenna isolation degree is 30 dB.

Since the distance between the fourth antenna 111-4 and the antenna 121 of the second communication module 120 is 10 cm and the first communication module 110 uses the 2.4 GHz frequency, the path loss of the fourth antenna 111-4 is 20 dB. Accordingly, the first communication module 110 may change the output level of the fourth antenna 111-4 from 20 dBm to 10 dBm, so that the antenna isolation degree is 30 dB.

In addition, the second communication module 120 may transmit a second signal to the first communication module 110 through the interface 130 upon completion of data reception. For example, the second signal may be a high signal. The first communication module 110 receiving the second signal may recover the output level of each the antennas 111-1, 111-2, 111-3, and 111-4 to the output level before the change.

In addition, the second communication module 120 may transmit the second signal to the first communication module 110 through the interface 130 in a data transmission state.

In the example of FIG. 4B, the first communication module 110 receiving the second signal may change the output levels of the first to fourth antennas 111-1, 111-2, 111-3, and 111-4 from 18 dBm, 16 dBm, 14 dBm, and 10 dBm, back to 20 dBm, respectively.

In another exemplary embodiment, the processor 140 may measure and store the path loss for each of the antennas 111-1, 111-2, 111-3, and 111-4 of the first communication module 110. In addition, the processor 140 may re-measure the path loss at a predetermined time and update the stored measurement result. For example, when communication using the first communication module 110 and the second communication module 120 is not performed for a predetermined time or more, the processor 140 may re-measure the path loss. In this case, since the influence due to the internal structure of the electronic apparatus 100 and the accurate frequency used in the 2.4 GHz band are reflected, the output level of the first communication module 110 may be adjusted more precisely.

In this way, when another wireless communication module using the same frequency band as the wireless communication module of the MIMO specification receives data, the wireless communication module of the MIMO specification can avoid coexistence interference by adjusting the output level. The output level to be adjusted is an output level enough for other wireless communication modules to be isolated, and may be set differently for each antenna.

Figure 5:
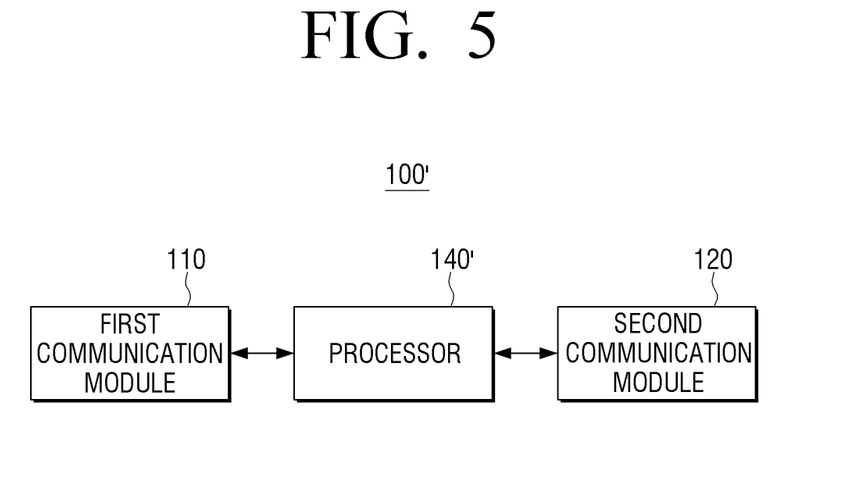
FIG. 5 is a block diagram for illustrating a configuration of an electronic apparatus according to another exemplary embodiment.

FIG. 5 is a block diagram for explaining a configuration of an electronic apparatus 100' according to another exemplary embodiment. In the embodiment of FIG. 5, the electronic apparatus 100' may include a processor 140 for controlling the first communication module 110 and the second communication module 120. The difference between the electronic device 100' and the electronic device 100 is that the processor 140' determines the Rx/Tx state of the second communication module 120 and controls the transmission output level of the first communication module 110 to change.

For example, when the second communication module 120 receives data in the Rx state, the processor 140' may change the transmission output level of the first communication module 110. When the data reception of the second communication module 120 is completed or when the second communication module 120 is in the Tx state), the processor 140' may restore the transmission output level of the first communication module 110 to the transmission output level before the change.

The second communication module 120 may transmit a signal indicating data reception and data reception completion (or Rx/Tx state) to the processor 140'. For example, the signal indicating the Rx/Tx state may be implemented as a 1-bit signal.

Specifically, when data is received in the second communication module 120, the processor 140' may change the transmission output level of the first communication module 110 according to a distance between the plurality of antennas 111-1, 111-2, 111-3, and 111-4 of the first communication module 110 and the antenna 121 of the second communication module 120 and an absolute maximum reception level of the second communication module 120.

As another example, the processor 140' may measure path loss of the first communication module 110 and store the measurement result in the storage 150. Specifically, when data is received in the second communication module 120, the processor 140' may change the transmission output level of the first communication module 110 according to the stored radio signal measurement result and the absolute maximum reception level of the second communication module 120.

In addition, when the first communication module 110 is implemented in the MIMO specification, the processor 140' may individually change the transmission output levels of the plurality of antennas 111-1, . . . , 111-n. The feature such as how to reduce the transmission output level in each of the antennas 111-1, . . . , 111-n are the same as those of the electronic apparatus 100 and thus, description thereof will be omitted.

Figure 6:
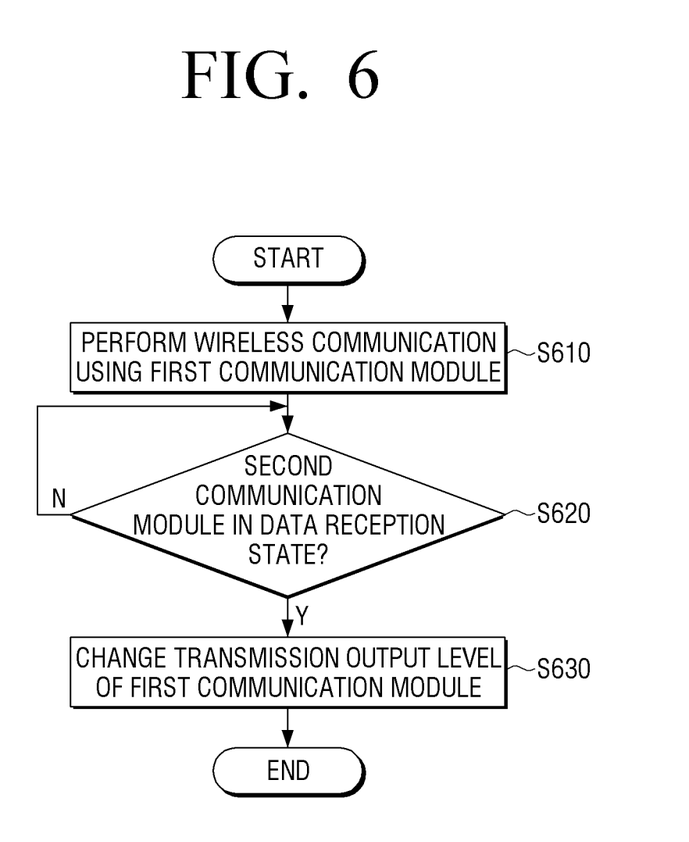
FIGS. 6 and 7 are flowcharts for explaining a controlling method of an electronic apparatus according to an exemplary embodiment.
Figure 7:
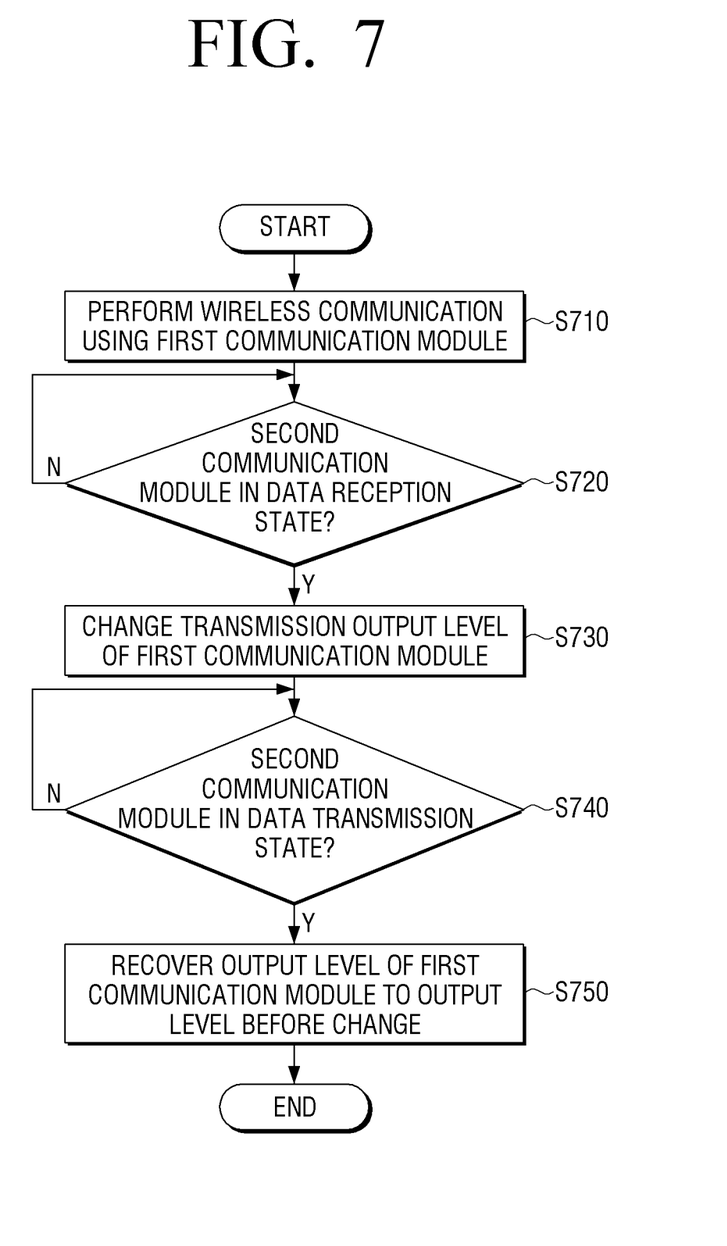

FIGS. 6 and 7 are flowcharts for explaining a controlling method of an electronic apparatus according to an exemplary embodiment.

Referring to FIG. 6, the electronic apparatus 100 may perform wireless communication using the first communication module 110 in operation 5610. For example, the first communication module 110 may use at least one communication method of WIFI and WIFI direct. In addition, the first communication module 110 may be a communication module having a larger output than the second communication module 120. In addition, the first communication module 110 may be implemented in the MIMO specification. The second communication module 120 may use at least one communication method of Bluetooth, BLE, ZigBee, and RF4CE methods.

The first communication module 110 and the second communication module 120 may use the same frequency band. Accordingly, coexistence interference may occur when the first communication module 110 and the second communication module 120 operate at the same time. For example, the first communication module 110 and the second communication module 120 may use the ISM band of 2.4 GHz.

When data is received by the second communication module 120 while the first communication module 110 performs wireless communication in operation S620, the electronic apparatus 100 may change the transmission output level of the first communication module 110 in operation S630. Specifically, data is received by the second communication module 120 during the wireless communication of the first communication module 110, the second communication module may transmit a first signal indicating reception state to the first communication module through the interface. In addition, when the first signal is transmitted from the second communication module 120 to the first communication module 110, the electronic apparatus 100 may change the transmission output level of the first communication level of the first communication module 110 according to a distance between the plurality of antennas 111-1, 111-2, 111-3, and 111-4 of the first communication module 110 and the antenna 121 of the second communication module 120, the frequency used by the first communication module 110, and the absolute maximum reception level of the second communication module 120.

For example, if the first communication module 110 of the electronic apparatus 100 is implemented in the MIMO specification including a plurality of antennas 111-1, 111-2, 111-3, and 111-4, the electronic apparatus 100 may adjust the output levels of the plurality of antennas 111-1, 111-2, 111-3, and 111-4 differently. Because the distances between each of the plurality of antennas 111-1, 111-2, 111-3, and 111-4 of the first communication module 110 and the second communication module 120 are different, the electronic apparatus 100 needs to adjust the output levels differently for each of the plurality of antennas 111-1, 111-2, 111-3, and 111-4.

According to another exemplary embodiment, the electronic apparatus 100 may measure the path loss of the first communication module 110. For example, since the frequency actually used by the first communication module 110 may not be exactly 2.4 GHz, it is possible to initially measure the path loss of the first communication module 110 and store the measurement result. When the first signal is transmitted from the second communication module 120 to the first communication module 110, the electronic apparatus 100 may change the transmission output level of the first communication module 110 according to the stored path loss measurement result and the absolute maximum reception level of the second communication module 120.

Referring to FIG. 7, operations S710 to S730 in which the electronic apparatus 100 changes the output level of the first communication module 110 are the same as operations S610 to S630. Therefore, description of operations S710 to S730 will be omitted and operation S740 will be described hereinafter.

When that state of the second communication module 120 is changed to the Tx state in which data is transmitted in operation S740, the electronic apparatus 100 may recover the output level of the first communication module 110 to the output level before the change in operation S750. Specifically, when the second communication module 120 is changed to the state in which data is transmitted, the second communication module may 120 transmit a second signal indicating transmission state to the first communication module 110 through the interface 130. In addition, when the second signal is transmitted from the second communication module 120 to the first communication module 110, the electronic apparatus 100 may recover the transmission output level of the first communication module 110 to the output level before the change.

As another example, when data reception of the second communication module 120 is completed, the electronic apparatus 100 may recover the output level of the first communication module 110 to the output level before the change. Specifically, when data reception of the second communication module 120 is completed, the second communication module 120 may transmit a second signal indicating transmission state to the first communication module 110 through the interface 130. In addition, when the second signal is transmitted from the second communication module 120 to the first communication module 110, the electronic apparatus 100 may recover the transmission output level of the first communication module 110 to the output level before the change.

Figure 8:
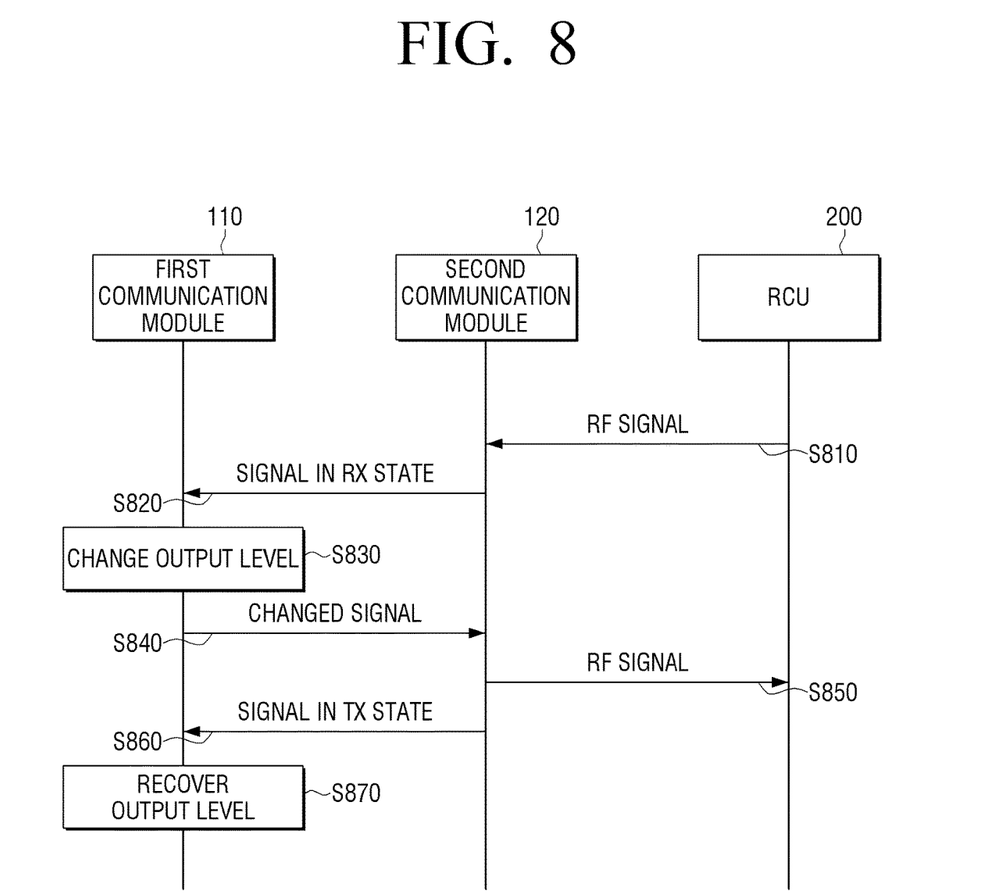
FIG. 8 is a sequence diagram for explaining the operation of an electronic apparatus according to an exemplary embodiment.

FIG. 8 is a sequence diagram for explaining the operation of an electronic apparatus according to an exemplary embodiment. The electronic apparatus 100 may communicate with a radio frequency (RF) remote control unit (RCU) 200 via the second communication module 120. The electronic apparatus 100 may receive a user command input to the RCU 200 via an RF signal, and perform an operation corresponding to the user command. In order to solve the problem that an operation input from the RCU is not performed due to coexistence interference with the first communication module 110, the electronic apparatus 100 according to an exemplary embodiment may adjust the transmission output level of the first communication module 110 while the second communication module 120 is receiving the signal.

Specifically, the RCU 200 may transmit an RF signal corresponding to the user command to the second communication module 120 in operation S810. Then, the second communication module 120 receiving the RF signal may transmit a signal indicating that the signal is received at the first communication module 110 in operation S820. The first communication module 110 receiving the signal may change the output level in operation S830. The details of the output level change correspond to those of the electronic apparatus 100 described above and thus will be omitted.

The first communication module 110 may transmit a signal indicating that the output level has been changed to the second communication module 120. Accordingly, the second communication module 120 may perform communication through the RF signal without receiving the wireless communication interference from the first communication module 110 in operation S850.

When the second communication module 120 transmits a signal to the RCU 200 or completes the communication with the RCU 200, the second communication module 120 transmits a signal indicating the transmission state to the first communication module 110 in operation S860. Then, the first communication module 110 receiving the signal indicating transmission state may recover the output level in operation 5870.

According to various exemplary embodiments as described above, it is possible to optimize the wireless communication antenna output level of the MIMO specification according to the difference in path loss. Even in the case of a miniaturized electronic device in which a sufficient separation distance between the antennas cannot be ensured, the interference problem between the plurality of wireless communication modules using the same frequency band can be avoided to operate normally. For example, when the electronic device is a miniaturized set-top box (STB), the RF4CE communication module communicating with the RCU can operate normally even if the WIFI communication module of the MIMO specification is used.

The methods according to one or more exemplary embodiments may be implemented as a program command type that may be performed through various computer units and may be recorded in a computer readable medium. The computer-readable medium may include a program command, a data file, a data structure or the like, alone or a combination thereof. The program commands recorded in the computer-readable medium may be designed for the exemplary embodiments or be known to those skilled in a field of computer software. Examples of computer-readable media include magnetic media such as hard disks, floppy disks, and magnetic tape; optical media such as CD-ROMs and DVDs; magnetic media such as floppy disks; Magneto-optical media, and hardware devices specifically configured to store and execute program instructions such as ROM, RAM, flash memory, and the like. The program commands may include not only machine codes which are made by a compiler, but also high-level language code which can be executed via computer by using interpreter. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus, comprising:
a first communication module comprising a first antenna and configured to communicate in a first communication method; and
a second communication module comprising a second antenna and configured to communicate in a second communication method,
wherein the first communication module is further configured to:
in response to a reception of data by the second communication module, change a transmission output level of the first antenna from a first level to a second level based on a maximum reception level of the second antenna and path loss of a signal transmitted from the first antenna to the second antenna, and
in response to the reception of the data being completed by the second communication module, change the transmission output level of the first antenna from the second level to the first level.

2. The electronic apparatus as claimed in claim 1, further comprising:
an interface configured to connect the first communication module and the second communication module,
wherein the second communication module is further configured to, in response to the reception of the data by the second communication module, transmit a first signal indicating a reception state of the second communication module to the first communication module through the interface.

3. The electronic apparatus as claimed in claim 2, further comprising:
a storage; and
a processor configured to measure the path loss of the signal transmitted from the first antenna to the second antenna and store the path loss in the storage,
wherein the processor is further configured to, in response to the reception of the data by the second communication module, control the first communication module to change the transmission output level of the first antenna based on the path loss stored in the storage and the maximum reception level of the second antenna.

4. The electronic apparatus as claimed in claim 1, wherein the first communication module comprises a plurality of antennas comprising the first antenna and is further configured to change a transmission output level of each of the plurality of antennas.

5. The electronic apparatus as claimed in claim 1, wherein the first communication method comprises at least one of WIFI and WIFI direct, and
wherein the second communication method comprises at least one of Bluetooth, Bluetooth Low Energy (BLE), ZigBee, and Radio Frequency for Consumer Electronics (RF4CE).

6. The electronic apparatus as claimed in claim 1, further comprising: a processor configured to:
control the first communication module and the second communication module,
in response to the reception of the data by the second communication module, control the first communication module to change the transmission output level of the first antenna, and
in response to the reception of the data being completed by the second communication module, control the first communication module to change the transmission output level of the first antenna from the second level to the first level.

7. The electronic apparatus as claimed in claim 6, wherein the processor is further configured to, in response to the reception of the data by the second communication module, control the first communication module to change the transmission output level of the first antenna based on the maximum reception level of the second antenna and the path loss of a signal transmitted from the first antenna to the second antenna.

8. The electronic apparatus as claimed in claim 6, wherein the first communication module comprises a plurality of antennas comprising the first antenna, and
wherein the processor is further configured to control the first communication module to change a transmission output level of each of the plurality of antennas according to distances between each of the plurality of antennas and the second antenna.

9. The electronic apparatus as claimed in claim 6, further comprising:
- a power supply configured to supply power to the electronic apparatus,
- wherein the first communication module, the second communication module, and the processor are connected to the power supply to receive power.

10. The electronic apparatus as claimed in claim 1, further comprising:
- wherein the first communication module is further configured to, in response to the reception of data by the second communication module, change the transmission output level of the first antenna based on a distance between the first antenna and the second antenna.

11. A controlling method of an electronic apparatus, the controlling method comprising:
- performing wireless communication in a first communication method by using a first communication module comprising a first antenna and in a second communication method by using a second communication module comprising a second antenna;
- in response to a reception of data by the second communication module during the wireless communication, changing a transmission output level of the first antenna from a first level to a second level based on a maximum reception level of the second antenna and path loss of a signal transmitted from the first antenna to the second antenna; and
- in response to the reception of the data being completed by the second communication module, changing the transmission output level of the first antenna from the second level to the first level.

12. The controlling method as claimed in claim 11, wherein the changing from the first level to the second level comprises transmitting, from the second communication module to the first communication module, a first signal indicating a reception state of the second communication module, in response to the reception of the data by the second communication module during the wireless communication.

13. The method as claimed in claim 12, further comprising:
- measuring the path loss of the signal transmitted from the first antenna to the second antenna; and
- storing the path loss,
- wherein the changing the transmission output level from the first level to the second level comprises changing the transmission output level of the first antenna based on the stored path loss and the maximum reception level of the second antenna, in response to the reception of data by the second communication module.

14. The controlling method as claimed in claim 11, wherein the changing from the first level to the second level comprises changing a transmission output level of each of a plurality of antennas of the first communication module, and
- wherein the plurality of antennas comprise the first antenna.

15. The controlling method as claimed in claim 11, wherein the first communication method comprises at least one of WIFI and WIFI direct, and
- wherein the second communication method comprises at least one of Bluetooth, Bluetooth Low Energy (BLE), ZigBee, and Radio Frequency for Consumer Electronics (RF4CE).

16. The controlling method as claimed in claim 11, wherein the first communication method and the second communication method comprises a 2.4 GHz frequency band.

17. An electronic apparatus, comprising:
- a first communication module comprising a plurality of first antennas and is configured to wirelessly communicate in a first communication method using the plurality of first antennas;
- a second communication module comprising at least one second antenna and is configured to wirelessly communicate in a second communication method that is different from the first communication method and consume low power compared to the first communication module; and
- a processor configured to:
- adjust, in response to a reception of data by the second communication module, a transmission power level of each of the plurality of first antennas based on a maximum reception level of the at least one second antenna and path loss of a signal transmitted from the plurality of first antennas to the at least one second antenna.

* * * * *